Patented July 18, 1950

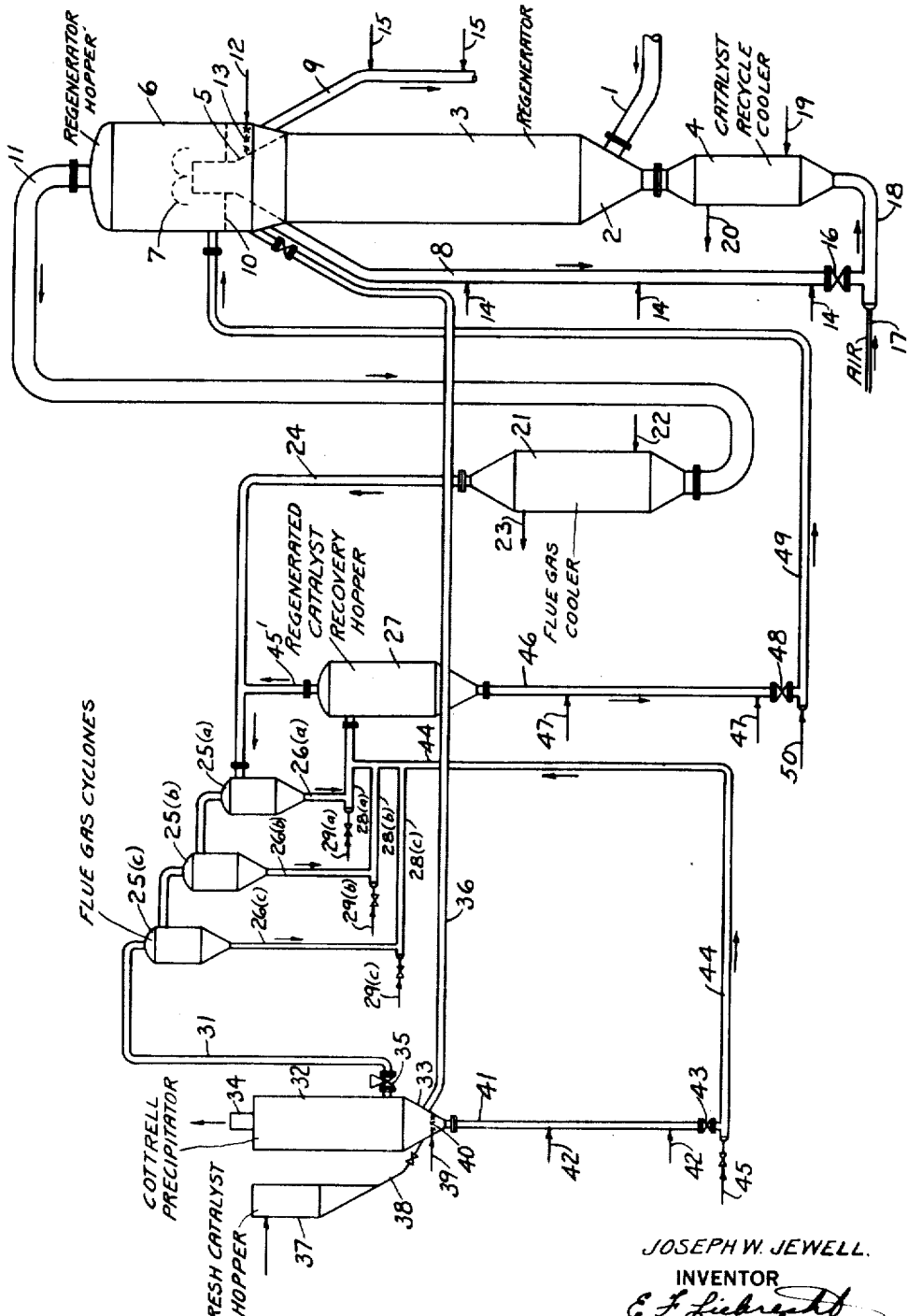

2,515,371

UNITED STATES PATENT OFFICE 2,515,371

METHOD FOR RECOVERY OF POWDERED CATALYST IN CONVERSION OPERATIONS ON GASES OR VAPORS

Joseph W. Jewell, Summit, N. J., assignor to The M. W. Kellogg Company, Jersey, City, N. J., a corporation of Delaware Application March 31, 1941, Serial No. 386,134

2 Claims. (Cl. 23—1)

The present invention relates to an improved method for the recovery of finely divided or powdered solids from gaseous suspensions thereof. More particularly, the invention pertains to the recovery of finely divided contact or catalytic material from gaseous or vaporous suspensions thereof produced during various conversion operations, as for example the catalytic cracking of high boiling hydrocarbons to low boiling hydrocarbons within the gasoline boiling range.

It has been proposed to effect the conversion of hydrocarbons by a continuous cyclic operation wherein a finely divided catalytic material is mixed with a stream of the vapors of the hydrocarbons undergoing treatment, and the mixture passed continuously through a conversion zone maintained under suitable conditions to effect the desired conversion. The spent catalytic material is separated from the vaporous conversion products and regenerated for reuse in the conversion operation by combustion of the deactivating deposits such as carbonaceous material formed thereon during the conversion operation. Regeneration is effected by mixing the spent catalytic material with an oxygen-containing gas and passing the mixture through a regeneration zone maintained under suitable conditions to effect the desired combustion without subjecting the catalyst to excessive temperatures which would unduly impair its catalytic activity. The regenerated catalytic material is then recovered from the combustion gases by suitable separating means, and returned to the conversion system. Since a conversion operation of this type involves the circulation of a very substantial quantity of catalyst in proportion to the charging stock in both the conversion and regeneration stages, its economic feasibility is largely dependent upon the efficiency with which the catalytic material is recovered from the gaseous or vaporous suspensions.

It has been proposed to effect this recovery by passing the gaseous suspension of finely divided catalytic material successively through a plurality or series of separating zones, each of which operates to separate part of the suspended material. Incident to such procedures, the relatively fine material is separated in the last separating zone. With such recovery systems, it is also considered desirable that the suspension be supplied to the series of separating zones at a pressure sufficiently high to pass through all of the zones without any recompression by means of fans or blowers between the zones because of the undesirable attrition on the suspended solids resulting from the passing of them through compression fans or blowers and the investment cost incident to the use of such compression devices.

Several serious problems arise in connection with recovery systems of the above described type. One of these problems results from the classification of the particles into relatively fine and relatively coarse fractions incident to their passage through the several separating zones. Since under normal operations it is preferable to maintain particle size distribution of the catalytic material substantially constant during the operation, it is desirable that these various size classifications be combined and returned to the conversion system in such manner as to maintain the particle size distribution of the catalyst as circulated through the conversion zone substantially constant. A further problem arises with respect to the difficulty of transporting the extremely fine fraction since it has been ascertained that these particles are not readily flowable and normally must be conveyed against a back pressure higher than that maintained in the zone in which they are separated.

The primary object of the present invention is the provision of a method for the recovery of finely divided catalyst from gaseous suspension wherein these problems and difficulties are obviated.

One of the features of the present invention whereby the difficulties arising out of the segregation of the extremely fine catalytic particles and their lack of free flowing characteristics is eliminated, involves mixing therewith relatively coarse particles preferably derived from a previous stage of the recovery operation. Various other specific features and advantages of the invention will be apparent from the following detailed description of its practice given in connection with the appended drawing.

The drawing illustrates an embodiment of the invention as applied to the regeneration of a powdered or finely divided spent cracking catalyst such as an activated clay of the "Super-Filtrol" type and shows a suitable arrangement of apparatus and process flow for this purpose.

Certain features of the process flow and apparatus are disclosed in my copending applications Serial No. 348,365, filed July 30, 1940, now U. S. Patent 2,304,827, and Serial No. 394,440, filed July 21, 1941, now U. S. Patent 2,439,811.

The used or spent catalyst to be regenerated by combustion of the carbonaceous deposit thereon enters the system from the conversion system through line 1 carried in a suitable conveying gas such as air or steam, or a mixture thereof, and is introduced into the bottom cone 2 of the regenerator 3. Normally, the used catalyst thus introduced is at an elevated temperature approximating the temperature utilized in the conversion zone. In cone 2 the stream of hot spent catalyst introduced through line 1 meets and mixes with a stream of relatively cool recycled regenerated catalyst and air from heat exchanger or cooler 4 and passes therewith upwardly through the regenerator chamber 3. Operating conditions in the regeneration chamber preferably are maintained so as to maintain a relatively large concentration of catalyst and low vapor velocities in the regeneration zone. During the course of the travel of the spent catalyst upwardly through the regeneration chamber, combustion of the carbonaceous deposit is effected to required extent at an elevated temperature maintained below the safe maximum regeneration temperature.

Gaseous regeneration products (flue gas) and regenerated catalyst exit from the upper part of the regenerator through a constricted outlet 5, the vapor velocity through the outlet 5 being relatively great compared to that maintained in the regenerator. From outlet 5 the gaseous mixture exits into a separating hopper 6 of relatively large cross-sectional area such that the velocity of the gases therein is preferably of about the same magnitude or smaller than gas velocity in regenerator 3. A baffle 7 is preferably interposed directly in the path of the vapor mixture exiting from outlet 5 whereby it is directed laterally and downwardly thus functioning to propel catalyst particles present in the mixture out of the path of the vapor flow into a quiescent collecting zone defined by the inner walls of the outlet 5 and the lower inner walls of the settling or collecting hopper 6. Catalyst thus separated is withdrawn through lines 8 and 9 opening into the lower part of the collecting zone. A quantity of catalyst is preferably left at all times in said zone to maintain a level of catalyst therein at a substantial distance above said outlet opening as indicated by dotted line 10.

A suitable aerating and stripping medium such as steam is introduced through a line 12 terminating in suitable fluid distributing means 13, in the bottom of the mass of catalyst in the collecting zone to displace and strip regeneration gas entrained therewith and to maintain the mass in an aerated flowable condition. Any suitable number of lines 12 and 13 may be employed and be so distributed as to assure the required stripping and aerating effects. The stripping medium and stripped gases pass out of hopper 6 overhead through line 11.

Outlet lines for regenerated catalyst 8 and 9 preferably are provided with means at suitable intervals along their length for the introduction of an aerating medium such as steam or air into the interior thereof, these means being lines 14 leading to line 8 and lines 15 leading to line 9. An aerating medium is introduced into these lines in amount sufficient to impart the characteristics of a pseudo-liquid, that is, flowability and relatively high density to the catalyst flowing therethrough whereby the head of catalyst maintained in the outlet standpipe lines 8 and 9 will suffice to overcome the pressure differential existing between the point of entry and the point of discharge of the regenerated catalyst to and from these lines. Accordingly these standpipe lines 8 and 9 operate pursuant to the procedure disclosed and claimed in said U. S. Patent 2,304,827. Regenerated catalyst passing through line 9 is discharged to the conversion system. Regenerated catalyst is diverted and recycled through line 8 in amounts regulated by suitable valve means such as a slide valve 16 to provide the required temperature control in regenerator 3. From valve 16 the recycled catalyst is fed into a stream of air or other oxygen-containing gas supplied through line 17 and the mixture of gas and recycled catalyst pass through inlet line 18 to a heat exchanger or cooler 4, through which a suitable heat exchange medium is circulated by lines 19 and 20 and wherein the regenerated catalyst before passing to the inlet cone 2 is cooled to a suitable temperature to provide the required temperature control in regenerator 3.

Gaseous regeneration products mixed with a relatively small portion of the catalyst originally present therein are withdrawn from the upper part of hopper 6 through line 11 and pass to a series of separating zones constituted by suitable gas-solids separators such as cyclones, Cottrell precipitators, filters, or the like.

The gaseous suspension in outlet pipe 11 consists essentially of flue gas and residual suspended regenerated catalyst including both relatively fine and relatively coarse particles. This suspension is preferably supplied to the recovery system at a superatmospheric pressure sufficiently high to impel it completely therethrough and into the atmosphere from the final separating zone, the pressure in the successive separating zones being progressively lower in the direction of the flow of the suspension by reason of the pressure drop in the interconnecting lines and gas-solids separating means. Incidental to such separation it has been ascertained that classification and segregation of the particles occur, particularly segregation of the extremely fine particles, in the final separating zone, that is in the Cottrell precipitator as shown, or any other suitable means utilized for the separation of the last increment of the suspended particles.

In certain instances cooling of the suspension passing through line 11 may be desirable, as for example by passing it through a suitable cooler or heat exchanger 21 through which a heat exchange medium is circulated through lines 22 and 23, thereby effecting a reduction in temperature and volume of the suspension passing therethrough, it being understood however that such cooling is not essential and may be omitted.

From cooler 21 the gaseous suspension passes by line 24 to a suitable gas-solids separator, or preferably a series of such separators such as cyclone separators or the like, 25(a), 25(b), and 25(c). In each of these a part of the suspended particles consisting of relatively large or coarse particles compared to the particles separated in the final separating zone, is separated and withdrawn from the bottom of the separators through tail pipes 26(a), 26(b), and (26c). Material discharged from these tail pipes may be conveyed to a regenerated catalyst recovery hopper 27 through lines 28(a), 28(b), and 28(c) by way of transfer line 44 by means of a suitable fluid conveying medium, such as steam, supplied by jets through lines 29(a), 29(b) and 29(c).

From separator 25(c) the suspension passes by line 31 to a Cottrell precipitator 32 or other suitable means for separating the extremely fine particles from the gaseous suspension, the separated particles being collected in the bottom hopper 33 of the precipitator, and the separated gas exiting overhead to the atmosphere through line 34.

The Cottrell precipitator 32 is preferably operated under approximately atmospheric pressure, and a pressure reduction valve 35 is provided in line 31 for regulating the pressure so that the desired pressure may be maintained in separator 32 irrespective of the pressure in the discharge line leading from cyclone 25(c).

A continuous stream of previously separated relatively coarse particles is supplied to a mixing zone in hopper 33 through line 36 from hopper 6 for the purpose of mixing with and bringing the fines to a condition which may be described as "flowable" or "aeratable." Coarse particles supplied through line 36 may be supplemented or in some instances replaced by fresh or make-up catalyst supplied from hopper 37 through line 38. An aerating medium is supplied to the bottom of the hopper 33 through line 39 terminating in a distributor 40 for aerating the mixture therein and maintaining it in a readily flowable condition.

From hopper 33 the aerated mixture flows into an outlet standpipe 41, operating on a principle similar to standpipe 8, an aerating fluid such as steam being supplied thereto along its length through lines 42 to maintain the solid particles flowing therein in a pseudo-liquid condition. Standpipe 41 is preferably of a height sufficient to provide a fluid head sufficient to largely or entirely equalize the pressure differential between the hopper 32 and the zone of relatively high pressure to which the separated fines are suitably recycled back into the system, for example hopper 27 or hopper 6. From standpipe 41 the mixture is discharged by means of a suitable valve such as slide valve 43 into transfer line 44. Steam or other suitable conveying medium is supplied by line 45 to line 44 to convey the mixture to hopper 27 or if desired to any other zone containing previously separated coarse particles. The conveying gas passing through line 45 to hopper 27 obviously must flow against a back pressure corresponding to the pressure maintained in hopper 27 and accordingly the pressure of the gas supplied through line 45 is sufficient to overcome this back pressure and the pressure drop in line 44.

In passing through line 44 the mixture is combined with the streams from lines 28(a), 28(b) and 28(c) and passes to collecting hopper 27 wherein the combined fractions are separated and the gaseous suspending medium is separated overhead through line 45' into line 24. From hopper 27 the separated solids are withdrawn through a standpipe 46 operating on a principle similar to standpipes 8 and 41 and to which a suitable aerating medium is supplied through lines 47. Standpipe 46 is preferably of a height sufficient to largely or entirely equalize the difference in pressure between hopper 27 and hopper 6. From standpipe 46 the solids are fed through a suitable valve 48 into transfer line 49 wherein they are suspended by suitable conveying fluid supplied through line 50 and conveyed therethrough to hopper 6 and combined with the initially separated material.

The practice of the invention may be further exemplified by reference to conditions obtained in a specific example. Pursuant to this example, a regenerated powdered cracking catalyst was separated in the various separating zones based upon the quantity of material entering the system through line 1 approximately as follows:

|  | Per cent |
|---|---|
| Hopper 6 | 75 |
| Cyclone 25(a) | 20 |
| Cyclone 25(b) | 2.5 |
| Cyclone 25(c) | 1 |
| Precipitator 32 | 1.5 |

In this example, pressure conditions obtaining throughout the system were approximately as follows:

| Zone | Pressure, Lbs./Sq. In. Gauge |
|---|---|
| Regenerator 3 | 16 |
| Hopper 6 | 8 |
| Line 24 | 3 |
| Cyclone 25(a) (inlet) | 2.3 |
| Cyclone 25(b) (inlet) | 1.8 |
| Cyclone 25(c) (inlet) | 1.3 |
| Precipitator 32 (inlet) | 0.4 |
| Valve 44 | 5 |
| Hopper 27 | 3.5 |
| Valve 48 | 9.5 |

In this particular example, the powdered catalyst undergoing treatment was a cracking catalyst consisting of an activated clay of the "Super-Filtrol" type and the fines collected in hopper 33 were mixed with relatively coarse particles introduced through line 36 in about equal proportions. Obviously in certain instances the addition of more or less coarse particles may be necessary for best results. It is to be noted in the above example the pressure maintained at valve 43 at the bottom of standpipe 41 is 5 pounds whereas the pressure in hopper 27 is 3.5 pounds. Due to this pressure differential the catalyst may be introduced at a controlled rate regulated by valve 43 into the conveying fluid passing through line 44 to hopper 27.

While the embodiment of the invention described above is regarded as a preferred mode for its practice, it will be apparent to those skilled in the art that various changes and modifications may be made therein and various subcombinations of the described method may be employed without departing from the essential features of the invention, and such modifications are intended to be included within the scope of the appended claims.

I claim:

1. In a catalytic conversion system of the type wherein a gas or vapor passes upwardly in a contacting zone and is contacted in said zone with a dense turbulent suspended catalyst phase, wherein the bulk of the catalyst is removed from gases and vapors in an enlarged settling zone and wherein residual catalyst material is removed from gases or vapors by means of cyclone separators, the method of combining cyclone separated catalyst with settled catalyst which comprises discharging said cyclone separated catalyst into an external collection hopper and positively impelling cyclone separated catalyst into said settling zone.

2. In a catalytic conversion system of the type wherein a gas or vapor passes upwardly in a contacting chamber and is contacted in said chamber with a dense turbulent suspended catalyst phase, wherein the bulk of the catalyst is removed from gases or vapors in an enlarged settling chamber and wherein residual catalyst material is removed from gases or vapors by means of cyclone separators, the method of combining cyclone separated catalyst with settled catalyst which comprises introducing cyclone separated catalyst into an external catalyst collection chamber and positively impelling cyclone separated catalyst from said collection chamber into a chamber within the catalytic conversion system containing a body of settled catalyst.

JOSEPH W. JEWELL.

REFERENCES CITED

The following references are of record in the file of this patent:

UNITED STATES PATENTS

| Number | Name | Date |
|---|---|---|
| 727,030 | Tilghman | May 5, 1903 |
| 1,380,698 | Anspach et al. | June 7, 1921 |
| 1,553,539 | Kinyon | Sept. 15, 1925 |
| 1,997,125 | Soyez et al. | Apr. 9, 1935 |
| 2,231,424 | Huppke | Feb. 11, 1941 |
| 2,270,903 | Rudbach | Jan. 27, 1942 |
| 2,273,075 | Weems | Feb. 17, 1942 |
| 2,302,328 | Kelly | Nov. 17, 1942 |
| 2,451,803 | Campbell et al. | Oct. 19, 1948 |

FOREIGN PATENTS

| Number | Country | Date |
|---|---|---|
| 115,689 | Australia | Aug. 20, 1942 |